United States Patent
Schlenker

(10) Patent No.: US 6,971,277 B2
(45) Date of Patent: Dec. 6, 2005

(54) GEAR DRIVE CASING APPARATUS FOR ENCLOSING A GEAR DRIVE

(75) Inventor: Harold O. Schlenker, Aberdeen, SD (US)

(73) Assignee: Hub City Inc., Aberdeen, SD (US)

( * ) Notice: Subject to any disclaimer, the term of this patent is extended or adjusted under 35 U.S.C. 154(b) by 0 days.

(21) Appl. No.: 10/214,055

(22) Filed: Aug. 7, 2002

(65) Prior Publication Data

US 2004/0025614 A1  Feb. 12, 2004

(51) Int. Cl.[7] ............................................... F16H 1/16
(52) U.S. Cl. ........................................ 74/425; 74/425.5
(58) Field of Search ............................... 74/425, 425.5, 74/467, 412 R, 416

(56) References Cited

U.S. PATENT DOCUMENTS

| | | | | |
|---|---|---|---|---|
| 4,428,250 A | * | 1/1984 | Becker et al. ................. | 74/425 |
| 4,679,449 A | * | 7/1987 | Nagano et al. ................. | 74/12 |
| 5,259,261 A | * | 11/1993 | Michel ......................... | 74/425 |
| 5,287,770 A | * | 2/1994 | Mudd ........................ | 74/606 R |
| 2002/0014132 A1 | * | 2/2002 | Sueshige et al. .............. | 74/425 |
| 2002/0189386 A1 | * | 12/2002 | Greubel ....................... | 74/425 |

* cited by examiner

*Primary Examiner*—David M. Fenstermacher
(74) *Attorney, Agent, or Firm*—David J. Archer

(57) ABSTRACT

A gear drive casing apparatus is disclosed for enclosing a gear drive used in a hygienic and sanitary environment. The gear drive casing apparatus includes a member having an external contoured surface, the member enclosing the gear drive. A further member has a further external contoured surface, the surface and the further surface cooperating with each other to define therebetween a smooth uninterrupted intersection such that the contoured surfaces and the intersection therebetween are easily cleaned. The surfaces and intersection present a self-draining configuration which inhibits the entrapment therein of any deleterious materials that would support the growth of bacteria, fungi, mold and other microorganisms.

17 Claims, 10 Drawing Sheets

GEAR DRIVE CASING APPARATUS FOR ENCLOSING A GEAR DRIVE

BACKGROUND OF THE INVENTION

1. Field of the Invention

The present invention relates to a gear drive casing apparatus for enclosing a gear drive. More specifically, the present invention relates to a gear drive casing apparatus for enclosing a gear drive used in a hygienic and sanitary environment.

2. Background Information

In many industries such as the food preparation industry it is essential that food processing equipment be easily cleaned so that a build up of deleterious material thereon be inhibited such deleterious materials being conducive to the growth thereon of various microorganisms. More particularly, many pieces of food processing equipment include a gear drive such as a so called worm gear. The aforementioned gear drive includes a gear casing for supporting therein the gear drive. However, in the prior art, it has often proved to be the case that such gear casings define relatively complex external surfaces which tend to accumulate thereon such deleterious materials. Also, due to the relatively sharp corners defined between adjacent surfaces of prior art gear casings, there also tends to be a build up thereon of processed food which becomes lodged in crevices formed between such adjacent surfaces. Although a periodic washdown operation is performed on the prior art gear casings to remove any food particles therefrom, there is a tendency for such operation to be very time consuming and thus labor intensive. In view of the great importance of providing a hygienic and sanitary environment in the food processing industry and other industries requiring the avoidance of any growth of mold or other microorganisms therein, there has been a need in such industries for gear casings that can easily be cleaned so that the growth thereon of microorganisms can be inhibited.

Therefore, it is a primary feature of the present invention to provide a gear drive casing apparatus for enclosing a gear drive that overcomes the problems associated with the prior art arrangements.

Another feature of the present invention is the provision of a gear drive casing apparatus for enclosing a gear drive that enables a user thereof to easily wash down the surface thereof and to prevent the build up thereon of deleterious materials.

Other features and advantages of the present invention will be readily apparent to those skilled in the art by a consideration of the detailed description of a preferred embodiment of the present invention contained herein.

SUMMARY OF THE INVENTION

The present invention relates to a gear drive casing apparatus for enclosing a gear drive used in a hygienic and sanitary environment. The gear drive casing apparatus includes a member having an external contoured surface, the member enclosing the gear drive. A further member has a further external contoured surface, the surface and the further surface cooperating with each other to define therebetween a smooth uninterrupted intersection such that the contoured surfaces and the intersection therebetween are easily cleaned. The surfaces and intersection present a self-draining configuration which inhibits the entrapment therein of any deleterious materials that would support the growth of bacteria, fungi, mold and other microorganisms.

In a more specific embodiment of the present invention, the gear drive includes an input shaft which has a first and a second end. The input shaft defines a worm which is disposed between the first and second ends of the input shaft. A bearing is provided for bearingly supporting the second end of the input shaft. An output shaft is disposed angularly relative to the input shaft, the output shaft having a first and a second extremity. The output shaft defines a worm gear which is disposed between the first and second extremity of the output shaft. A second bearing is provided for bearingly supporting the first extremity of the output shaft. Also, a third bearing bearingly supports the second extremity of the output shaft. The arrangement is such that the worm gear cooperates with the worm so that the worm gear is driven by the worm.

Moreover, the gear drive casing is fabricated from a metallic material and preferably, the gear drive casing is coated with a non-corrosive coating material.

More specifically, the metallic material is stainless steel.

However, in another embodiment of the present invention, the non-corrosive coating material is a plastic material which may be a polymeric or an elastomeric material.

In a preferred embodiment of the present invention, the non-corrosive coating material is an epoxy. However, the non-corrosive coating material is alternatively a painted coating which is painted on cast iron.

The member encloses the first end of the input shaft and the further member encloses the second end of the input shaft and the bearing.

Furthermore, the member includes a flange which extends radially away from the first end of the input shaft such that the contoured surface defines a first area disposed in a vicinity of the first end of the input shaft and a second area disposed in a vicinity of the flange so that a transition from the first area to the second area is gradually curved thereby inhibiting a buildup of the deleterious materials between the areas.

Additionally, the gear drive casing apparatus further includes a closure which is defined by the further member. More specifically, the closure is recessed into the further external contoured surface and is sealed such that escape of lubricant from within the members is prevented and so that ingress of washdown liquids into the members is inhibited.

Also, the gear drive casing apparatus includes an interference fit flush plug which is disposed within the closure.

Furthermore, the gear drive casing apparatus includes an oil seal which cooperates with the input shaft for sealing the input shaft relative to the member. The oil seal defines a sealing lip which seals the input shaft. A further oil seal cooperates with the output shaft for sealing the output shaft relative to the further member. The further oil seal defines a further sealing lip which seals the output shaft.

In another embodiment of the present invention, an oil seal cooperates with the input shaft for sealing the input shaft relative to the member, the oil seal defining a plurality of sealing lips which seal the input shaft. Furthermore, a further oil seal cooperates with the output shaft for sealing the output shaft relative to the further member, the further oil seal defining a further plurality of sealing lips which seal the output shaft.

Moreover, the gear drive casing apparatus further includes a breather which is secured to the further member such that a build up of pressure within the members due to generation of heat during operation of the gear drive is prevented.

More particularly, the breather includes a housing which is secured to the further member. The housing defines an enclosure, the enclosure being in fluid communication with a further enclosure defined by the members. The further enclosure is occupied by the input and output shafts and a diaphragm is disposed within the enclosure such that the enclosure is divided by the diaphragm into an internal and an external chamber. The diaphragm moves within the enclosure so that the internal chamber expands commensurate with an increased temperature within the further enclosure due to operation of the gear drive and a resultant increased pressure within the further enclosure so that a pressure within the further enclosure remains substantially constant.

Many modifications and variations of the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims.

It is to be understood by those skilled in the art that the present invention is also applicable to bevel gear drives and the like and other types of gear drives.

BRIEF DESCRIPTION OF THE DRAWINGS

Similar reference characters refer to similar parts throughout the various views and embodiments of the drawings.

DETAILED DESCRIPTION OF THE DRAWINGS

Figure 1:
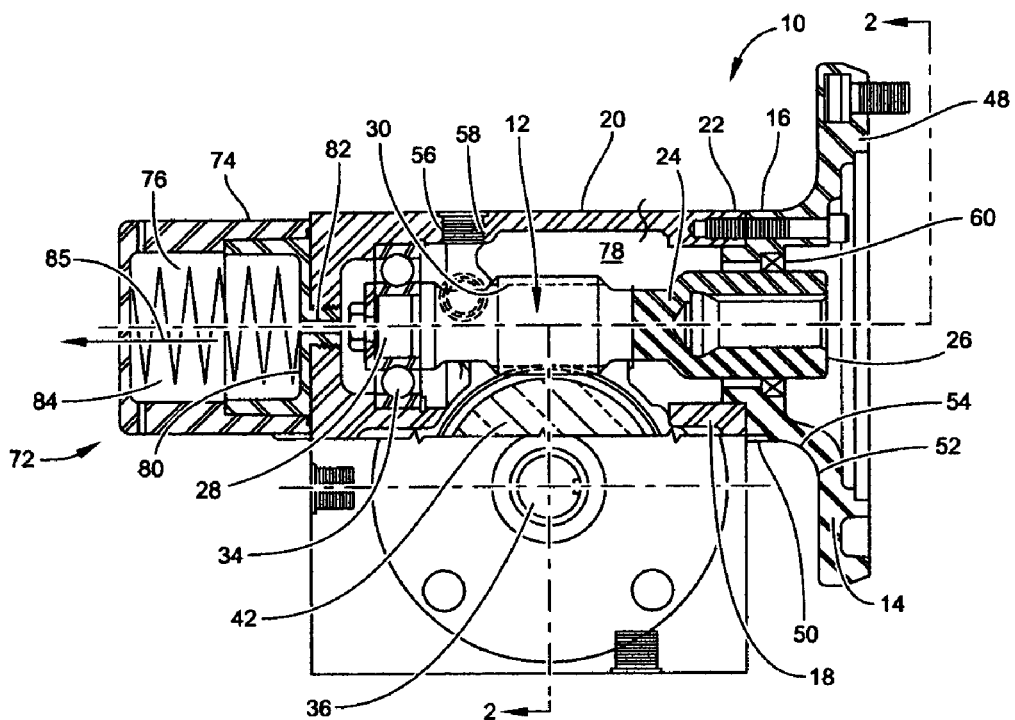
FIG. 1 is side elevational view partially in section of a gear drive casing apparatus according to the present invention for enclosing a gear drive used in a hygienic and sanitary environment.

FIG. 1 is side elevational view partially in section of a gear drive casing apparatus generally designated 10 according to the present invention for enclosing a gear drive generally designated 12 used in a hygienic and sanitary environment. The hygienic and sanitary environment may be a food handling or processing industry including but not limited to poultry and meat processing, cereal and grain processing or vegetable processing. The environment would alternatively be in the pharmaceutical, chemical processing or petroleum processing industries. However, it is to be understood by those skilled in the art that the present invention is not limited to the aforementioned industries.

As shown in FIG. 1, the gear drive casing apparatus 10 includes a member 14 having an external contoured surface 16, the member 14 enclosing the gear drive 12. A further member 18 has a further external contoured surface 20, the surface 16 and the further surface 20 cooperating with each other to define therebetween a smooth uninterrupted intersection 22 such that the contoured surfaces 16 and 20 respectively and the intersection 22 therebetween are easily cleaned. The surfaces 16 and 20 and intersection 22 present a self-draining configuration which inhibits the entrapment therein of any deleterious materials that would support the growth of bacteria, fungi, mold and other microorganisms.

In a more specific embodiment of the present invention, the gear drive 12 includes an input shaft 24 which has a first and a second end 26 and 28 respectively. The input shaft 24 defines a worm 30 which is disposed between the first and second ends 26 and 28 of the input shaft 24. A bearing 34 is provided for bearingly supporting the second end 28 of the input shaft 24.

Figure 2:
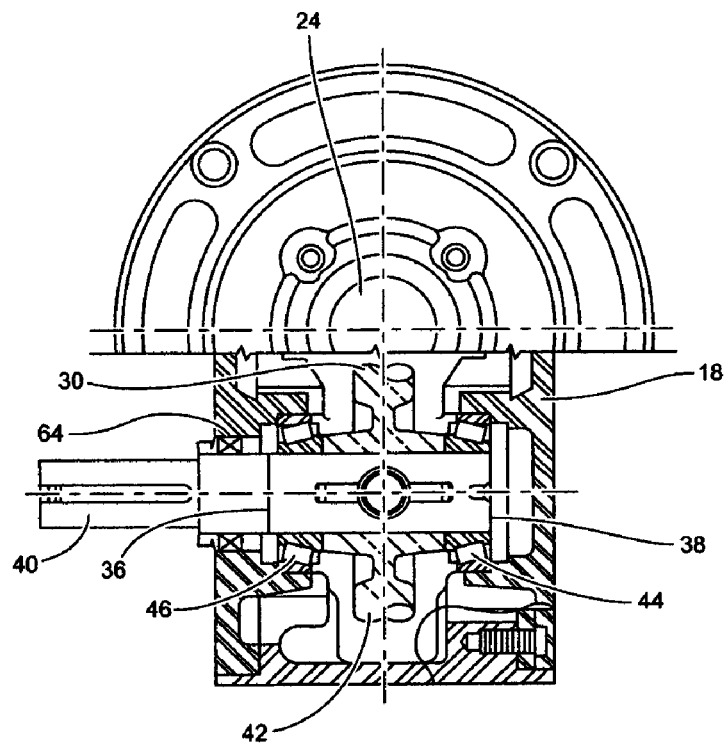
FIG. 2 is a sectional view taken on the line 2—2 of FIG. 1.

FIG. 2 is a sectional view taken on the line 2—2 of FIG. 1. As shown in FIG. 2, an output shaft 36 is disposed angularly relative to the input shaft 24, the output shaft 36 having a first and a second extremity 38 and 40 respectively. The output shaft 36 defines a worm gear 42 which is disposed between the first and second extremity 38 and 40 of the output shaft 36. A second bearing 44 is provided for bearingly supporting the first extremity 38 of the output shaft 36. Also, a third bearing 46 bearingly supports the second extremity 40 of the output shaft 36. The arrangement is such that the worm gear 42 cooperates with the worm 30 so that the worm gear 42 is driven by the worm 30.

Moreover, the gear drive casing apparatus 10 is fabricated from a metallic material and preferably, the gear drive casing is coated with a non-corrosive coating material.

More specifically, the non-corrosive coating material is a plastic material which may be a polymeric or an elastomeric material.

In a preferred embodiment of the present invention, the non-corrosive coating material is an epoxy. However, the non-corrosive coating material is alternatively painted cast iron.

As shown in FIG. 1, the member 14 encloses the first end 26 of the input shaft 24 and the further member 18 encloses the second end 28 of the input shaft 24 and the bearing 34.

Furthermore, the member 14 includes a flange 48 which extends radially away from the first end of the input shaft such that the contoured surface 16 defines a first area 50 disposed in a vicinity of the first end of the input shaft and a second area 52 disposed in a vicinity of the flange 48 so that a transition 54 from the first area 50 to the second area 52 is gradually curved thereby inhibiting a buildup of the deleterious materials between the areas 50 and 52.

Additionally, the gear drive casing apparatus 10 further includes a closure 56 which is defined by the further member 18. More specifically, the closure 56 is recessed into the further external contoured surface 20 and is sealed such that escape of lubricant from within the members 14 and 18 is prevented and so that ingress of washdown liquids into the members 14 and 18 is inhibited.

Also, the gear drive casing apparatus 10 includes an interference fit flush plug 58 which is disposed within the closure 56.

Furthermore, the gear drive casing apparatus 10 includes an oil seal 60 which cooperates with the input shaft 24 for sealing the input shaft 24 relative to the member 14.

Figure 3:
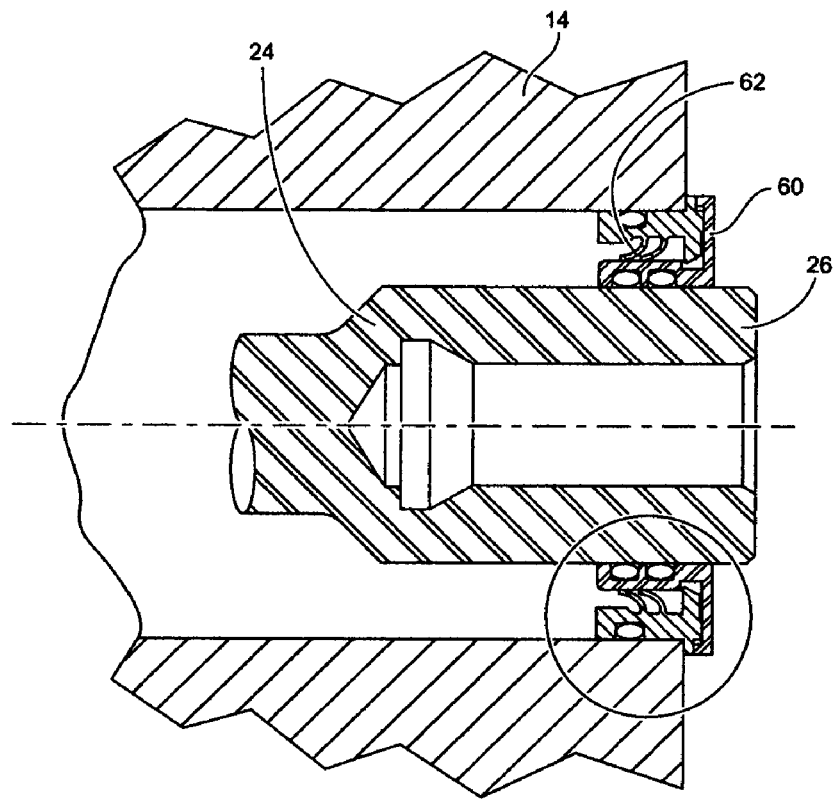
FIG. 3 is an enlarged sectional view of the oil seal shown in FIG. 1.

FIG. 3 is an enlarged sectional view of the oil seal 60 shown in FIG. 1. As shown in FIG. 3, the oil seal 60 defines a sealing lip 62 which seals the input shaft 24.

Figure 4:
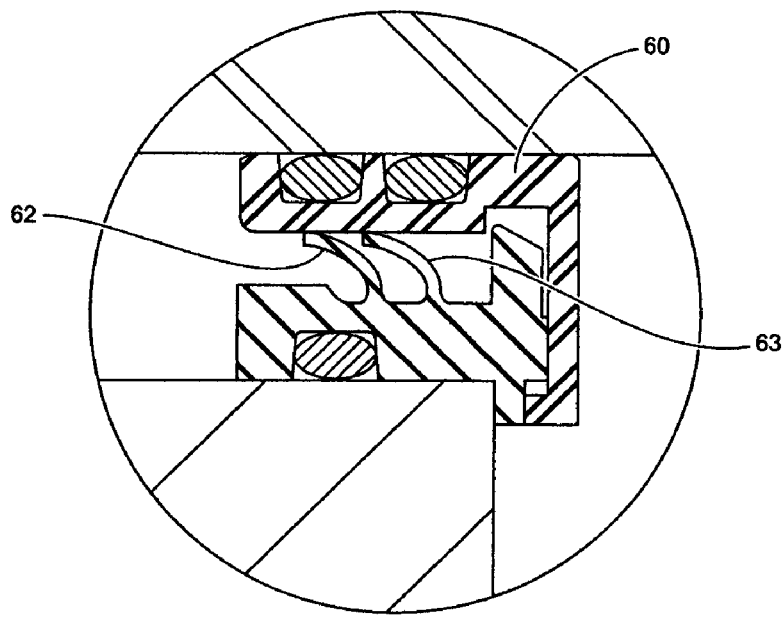
FIG. 4 is a view of the oil seal shown circled in FIG. 3.

FIG. 4 is a view of the oil seal shown circled in FIG. 3. As shown in FIG. 4, the oil seal 60 is a high-pressure labyrinth type of seal that is used on a gear drive when no type of pressure relief for the drive is available. The seal 60 is used as shown in FIGS. 3 and 4 when the input shaft 24 is not exposed to any washdown system. As shown in FIGS. 3 and 4, the seal 60 is used on the input shaft of a motorized gear drive as illustrated in FIGS. 1 and 2. Such seal 60 is used in conjunction with the member or mounting bracket 14. When the motor is assembled to the bracket 14 with the seal 60 between the bracket 14 and the motor, the non-exposed shaft 24 is not subject to the high-pressure washdown environment. Therefore, the seal 60 only needs to accommodate the high pressure that is produced within the gear drive due to temperature rise. As shown in FIGS. 3 and 4, the oil seal 60 defines a plurality of sealing lips 62 and 63 which provide a seal with the input shaft 24.

Figure 5:
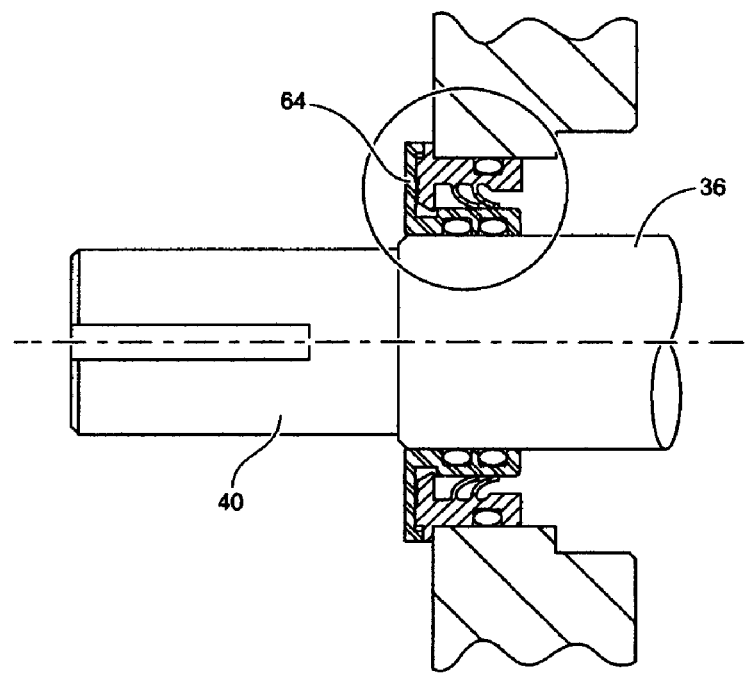
FIG. 5 is an enlarged sectional view of the further oil seal shown in FIG. 2 for sealing the second extremity of the output shaft.

FIG. 5 is an enlarged sectional view of the further oil seal 64 shown in FIG. 2 for sealing the second extremity 40 of the output shaft 36.

Figure 6:
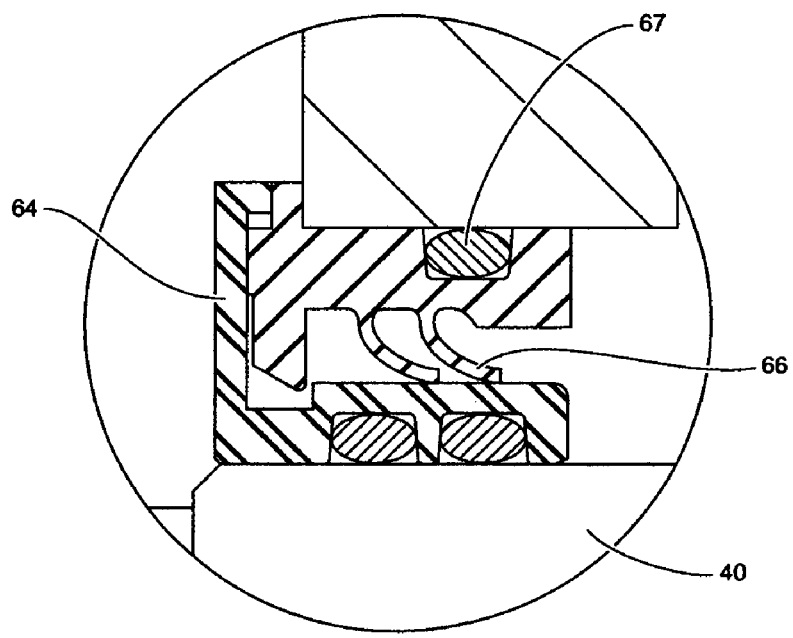
FIG. 6 is a view of the further oil seal shown circled in FIG. 5.

FIG. 6 is a view of the further oil seal 64 shown circled in FIG. 5. As shown in FIG. 6, such further seal 64 has a labyrinth system to protect the seal from the effects of a chemical high-pressure washdown system. The further seal 64 is capable of sealing at a pressure differential of 50 PSI.

As shown in FIG. 2, the further oil seal 64 cooperates with the output shaft 36 for sealing the output shaft 36 relative to the further member 18.

As shown in FIG. 6, the further oil seal 64 defines further sealing lips 66 and 67 which provides a seal with the output shaft 36.

Figure 7:
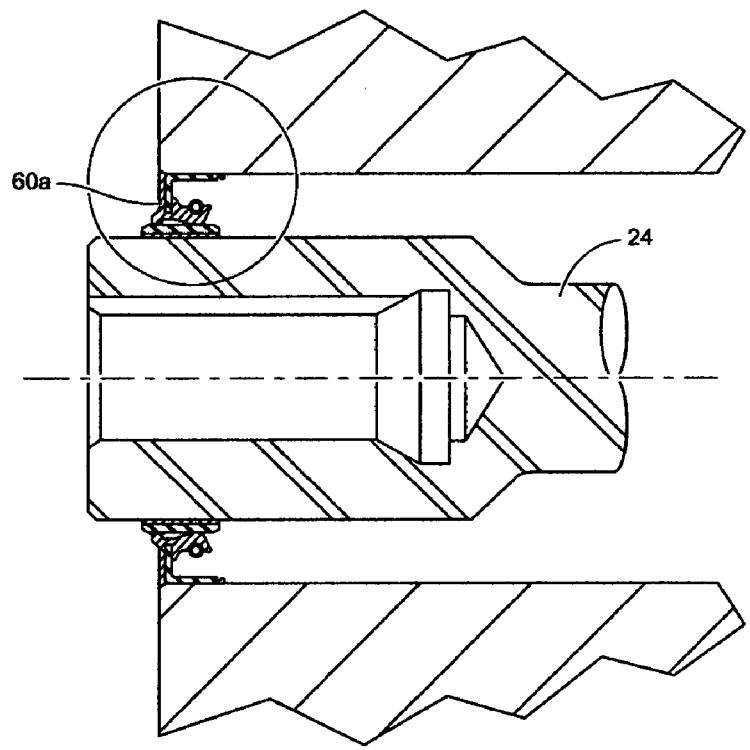
FIG. 7 is a similar view to that shown in FIG. 3 but shows an alternative type of seal.

FIG. 7 is a similar view to that shown in FIG. 3 but shows an alternative type of seal. As shown in FIG. 7, the seal 60a seals the input shaft 24.

Figure 8:
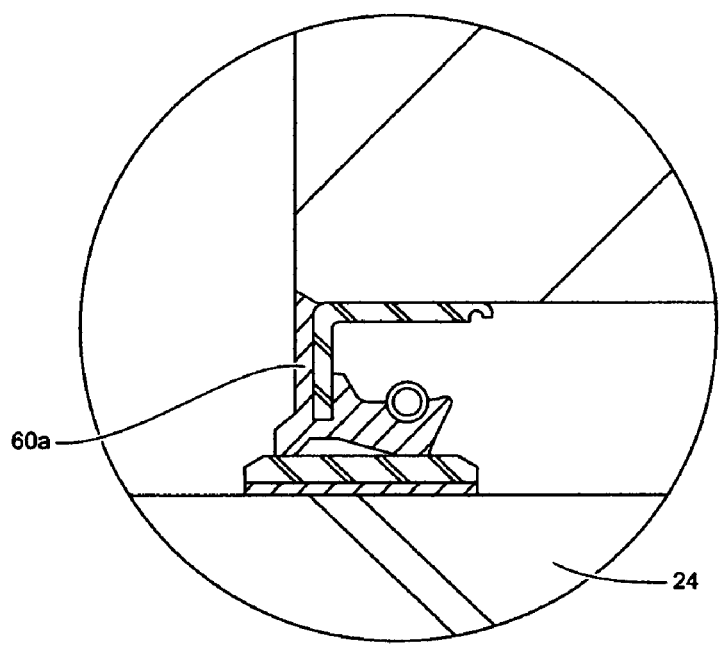
FIG. 8 is a view of the oil seal shown circled in FIG. 7.

FIG. 8 is a view of the oil seal shown circled in FIG. 7. As shown in FIG. 8, the high-pressure seal 60a will be used in conjunction with a gear drive that does not have a method of reducing the internal operating pressure.

Figure 9:
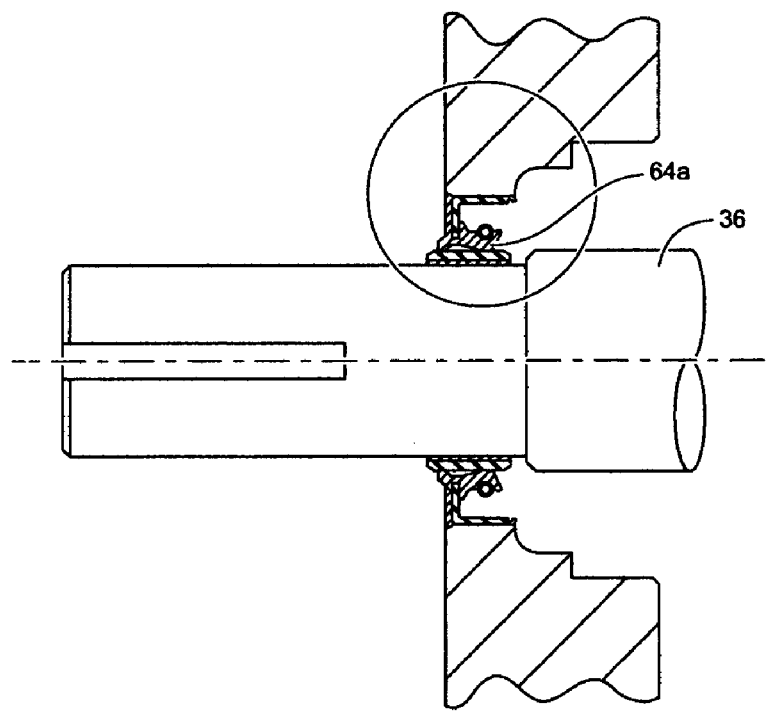
FIG. 9 is a similar view to that shown in FIG. 5 but shows an alternative type of further oil seal.

FIG. 9 is a similar view to that shown in FIG. 5 but shows an alternative type of further oil seal. As shown in FIG. 9, the further oil seal 64a seals the output shaft 36 and is identical in construction to the oil seal 60a shown in FIGS. 7 and 8.

Figure 10:
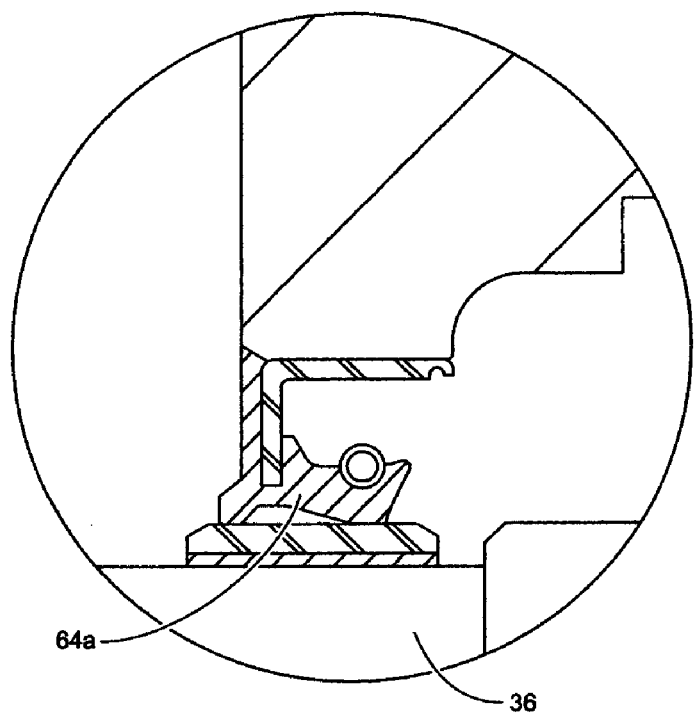
FIG. 10 is a view of the further oil seal shown circled in FIG. 9.
Figure 11:
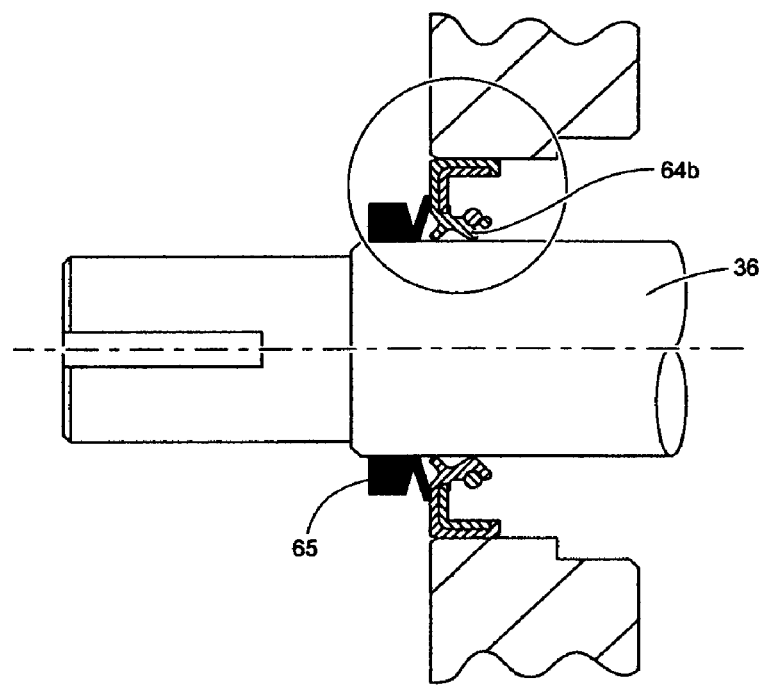
FIG. 11 is a similar view to that shown in FIG. 9 but shows another alternative type of further oil seal.

FIG. 10 is a view of the further oil seal 64a shown circled in FIG. 9;

FIG. 11 is a similar view to that shown in FIG. 9 but shows another alternative type of further oil seal. As shown in FIG. 11, the further oil seal 64b is used in conjunction with an expansion chamber to be described later herein or will be used in conjunction with a venting system for the gear drive that contains a check valve type vent that expels the pressure from the gearbox but closes to eliminate the ingestion of the outside environment. The seal 64b is of conventional design with a rubber or stainless steel shell about the outside of the seal. The seal 64b has a capability up to pressures of 5 PSI. As shown in FIG. 11, the seal 64b includes V-ring 65. The V-ring 65 protects the sealing lips from the high-pressure washdown environment.

Figure 12:
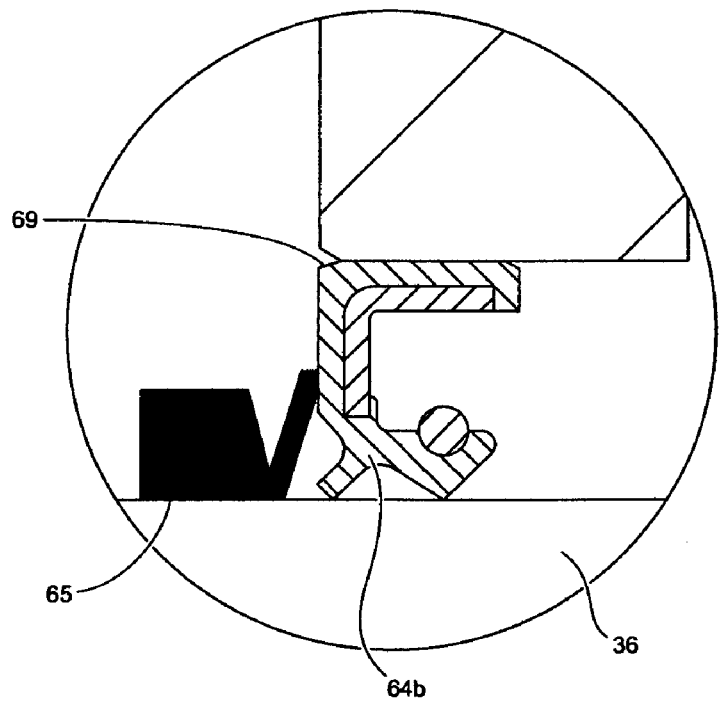
FIG. 12 is a view of the further oil seal shown circled in FIG. 11.

FIG. 12 is a view of the further oil seal 64b shown circled in FIG. 11.

Figure 13:
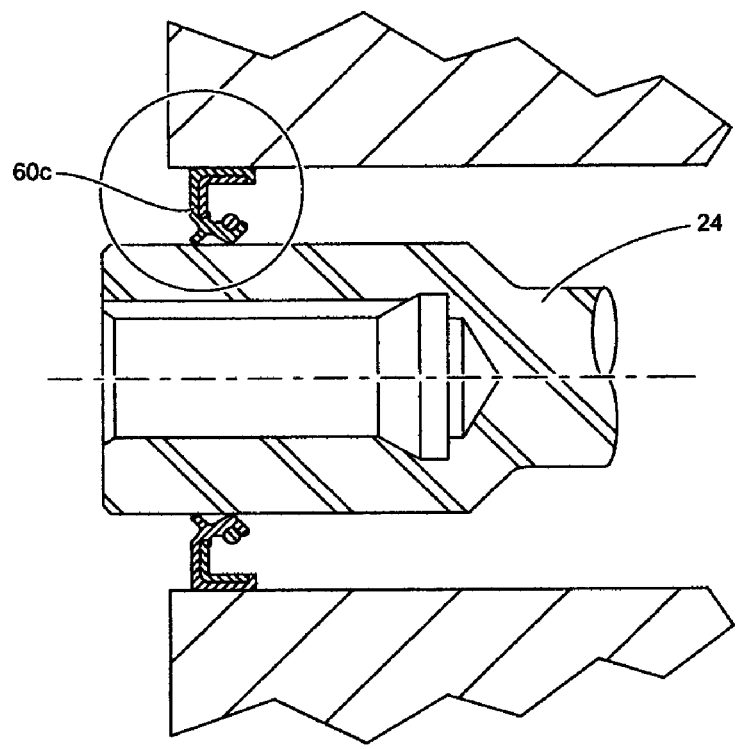
FIG. 13 is a similar view to that shown in FIG. 11 but shows another type of seal which is similar to the seal shown in FIGS. 11 and 12 but without the V-ring.

FIG. 13 is a similar view to that shown in FIG. 11 but shows another type of seal 60c which is similar to the seal 64b shown in FIGS. 11 and 12 but without the V-ring 65. The seal 60c is used in a non-exposed environment and would not be exposed to the washdown condition.

Figure 14:
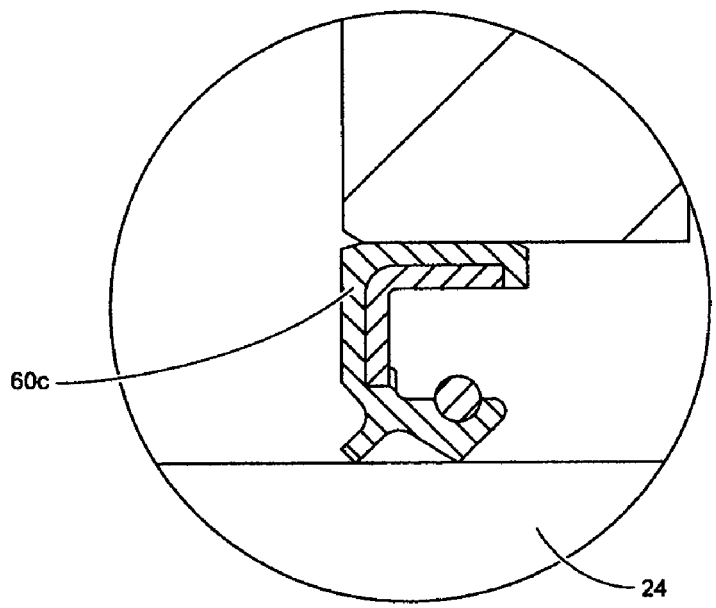
FIG. 14 is an enlarged view of the circled portion shown in FIG. 13.

FIG. 14 is an enlarged view of the circled portion shown in FIG. 13.

In FIGS. 3 and 4, 7 and 8 and 13 and 14 there is no bearing as the first end 26 of the input shaft 24 is supported by the motor. However, in FIGS. 5 and 6, 9 and 10 and 11 and 12 a bearing is disposed immediately adjacent to the seal.

Moreover, as shown in FIG. 1, the gear drive casing apparatus 10 further includes a breather generally designated 72 which is secured to the further member 18 such that a build up of pressure within the members 14 and 18 respectively due to generation of heat during operation of the gear drive 12 is prevented.

More particularly, the breather 72 includes a housing 74 which is secured to the further member 18. The housing 74 defines an enclosure 76, the enclosure 76 being in fluid communication with a further enclosure 78 defined by the members 14 and 18 respectively. The further enclosure 78 is occupied by the input and output shafts 24 and 36 respectively. A diaphragm 80 is disposed within the enclosure 76 such that the enclosure 76 is divided by the diaphragm 80 into an internal and an external chamber 82 and 84 respectively. The diaphragm 80 moves as indicated by the arrow 85 within the enclosure 76 so that the internal chamber 82 expands commensurate with an increased temperature within the further enclosure 78 due to operation of the gear drive 12 and a resultant increased pressure within the further enclosure 78 so that a pressure within the further enclosure 78 remains substantially constant.

One of the objectives of the present invention is to provide a casing for a gear drive that has a surface finish which will vary in accordance with the use of such casing. For example, the surface could vary from an as cast material to a machined and highly polished surface. The outside of the casing is designed to eliminate as many protrusions or entrapment areas as possible in order to facilitate the washdown function and to eliminate areas for material and bacteria to collect. Such is accomplished by recessing the closures or end caps into the inside of the housing, recessing the fasteners for the end cap into the end cap and covering them with an expansion plug to provide a smooth, uninterrupted surface on the gear drive. As adapting hardware needs to be supplied with the gear drive to accommodate motors or other types of mounting configurations, the external mounting adapters will be finished, according to the present invention, with large radii. The interface between the adapter and the main casing is arranged so as not to present sharp corners. However, any relatively sharp corners according to the present invention are sealed with food grade sealant providing a small radius to eliminate entrapment of material and bacteria. In the case of the seals 60 and 64, any sharp corners would be provided with a bead of sealant. In the arrangement shown in FIGS. 9 and 10, the outside rubber face of the seal 64a has a special lip that seals the chamfer between the end of the end cap and seal, eliminating the necessity of applying sealant. Also, the small crevice 69 shown in FIG. 12, is filled with sealant.

The material of the casing will most generally be a non-corrosive type of material, such as stainless steel, plastic or aluminum. Alternatively, the gear case could be of cast iron and covered with an epoxy paint. With a stainless steel, plastic or aluminum casing, there would be no coating applied to the material. In the case of an aluminum casing, a mechanical system of shot peening is used to prepare the aluminum surface so that such surface will not oxidize from the chemicals used in the washdown environment so that the surface presents a bright chrome like finish.

Figure 15:
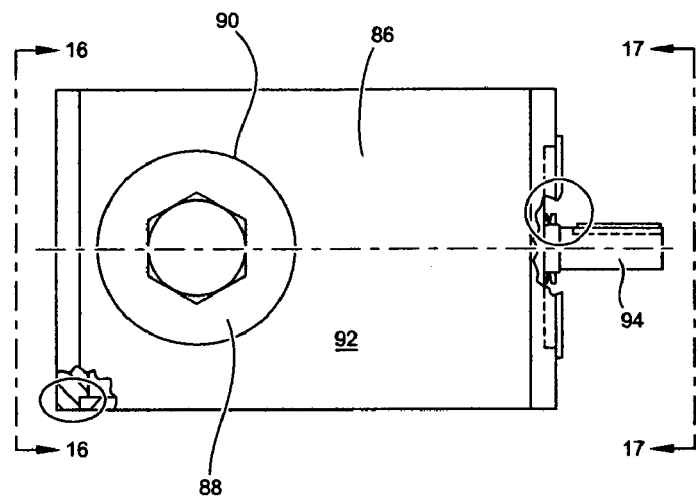
FIG. 15 is a side elevational view of a motor for driving the gear drive according to the present invention.

FIG. 15 is a side elevational view of a motor for driving the gear drive according to the present invention. As shown in FIG. 15, the motor 86 is an electric motor. Electric motors are not subject to internal pressure differentials, therefore, the exterior surface of the motor 86 is smooth and free of protrusions with all fasteners recessed and capped. A conduit box 88 of the motor 86 is configured as a round cylinder 90 which intersects the round body 92 of the motor 86.

Figure 16:
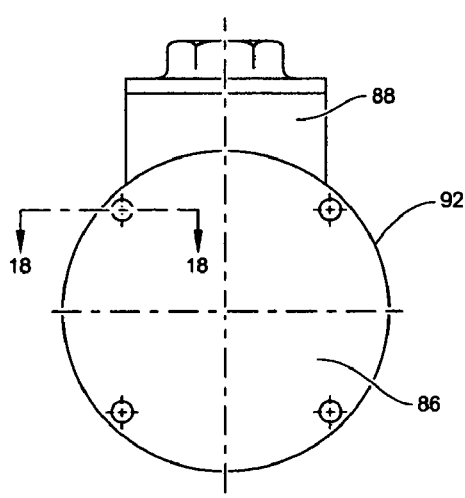
FIG. 16 is a view taken on the line 16—16 of FIG. 15.

FIG. 16 is a view taken on the line 16—16 of FIG. 15. As shown in FIG. 16, the conduit box 88 extends outwardly away from the body 92 of the motor 86.

Figure 17:
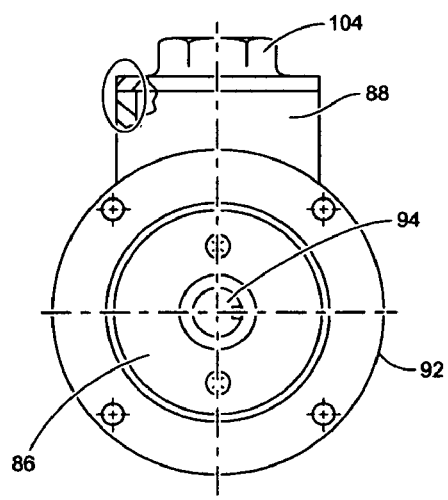
FIG. 17 is a view taken on the line 17—17 of FIG. 15.

FIG. 17 is a view taken on the line 17—17 of FIG. 15. As shown in FIG. 17, an output 94 of the motor 86 is disposed coaxially relative to the body 92 of the motor 86.

Figure 18:
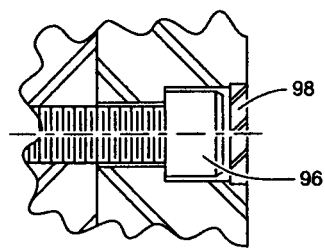
FIG. 18 is an enlarged fragmentary sectional view taken on the line 18—18 of FIG. 16.

FIG. 18 is an enlarged fragmentary sectional view taken on the line 18—18 of FIG. 16. As shown in FIG. 18, the fastener 96 is capped by a cap 98.

Figure 19:
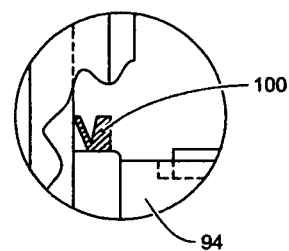
FIG. 19 is an enlarged view of the circled portion shown in FIG. 15.

FIG. 19 is an enlarged view of the circled portion shown in FIG. 15. As shown in FIG. 19, the output 94 of the motor 86 includes a V-ring seal 100.

Figure 20:
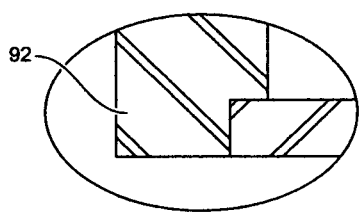
FIG. 20 is an enlarged view of the elliptical portion shown in FIG. 15.

FIG. 20 is an enlarged view of the elliptical portion shown in FIG. 15. As shown in FIG. 20, the adjacent portions of the motor body 92 are smooth.

Figure 21:
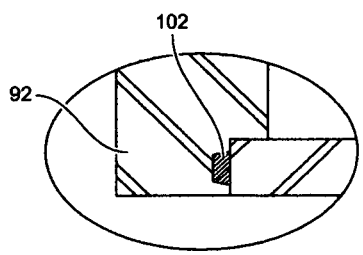
FIG. 21 is a similar view to that shown in FIG. 20 but shows an optional variant in which the adjacent portions of the body of the motor have a gasket interposed therebetween.

FIG. 21 is a similar view to that shown in FIG. 20 but shows an optional variant in which the adjacent portions of the body 92 have a gasket 102 interposed therebetween.

Figure 22:
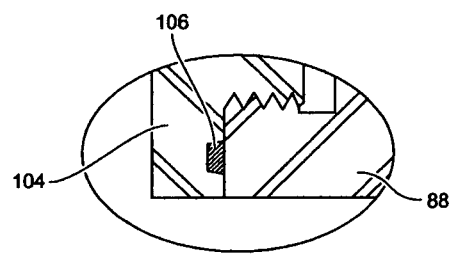
FIG. 22 is an enlarged view of the elliptical portion shown in FIG. 17.

FIG. 22 is an enlarged view of the elliptical portion shown in FIG. 17. As shown in FIG. 22, the conduit box 88 includes a threaded cover 104 with a gasket 106 disposed therebetween.

Figure 23:
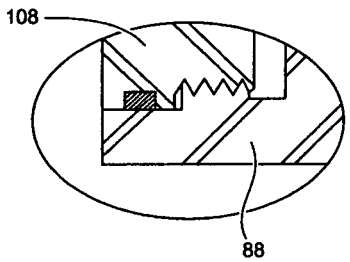
FIG. 23 is a similar view to that shown in FIG. 22 but shows an optional variant in which the the cover is recessed within the conduit box.

FIG. 23 is a similar view to that shown in FIG. 22 but shows an optional variant in which the the cover 108 is recessed within the conduit box 88.

Figure 24:
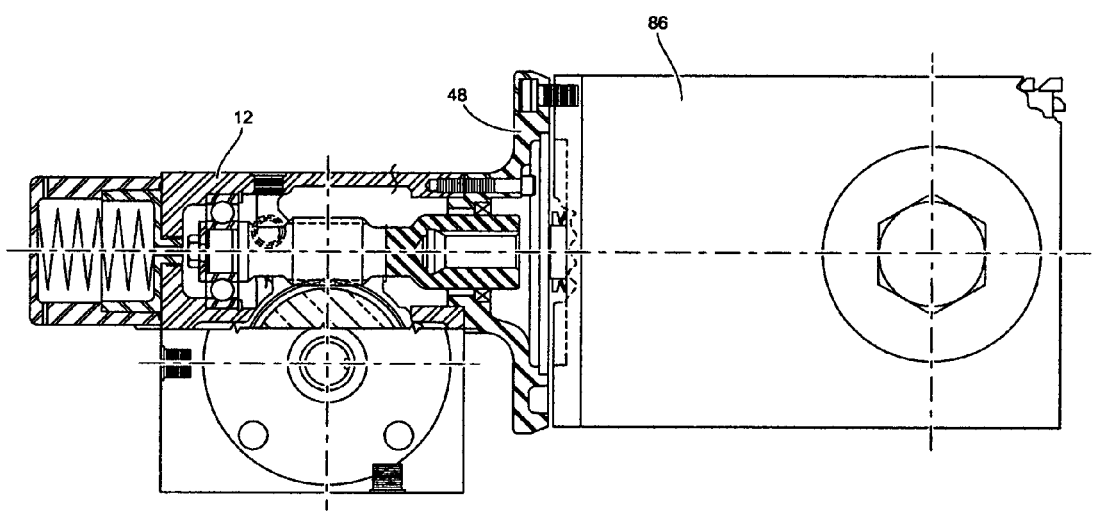
FIG. 24 is a side elevational view partially in section showing the combined motor and gear drive.

FIG. 24 is a side elevational view partially in section showing the combined motor and gear drive. As shown in FIG. 24, the motor 86 is secured to the gear drive 12 by fasteners extending through the flange 48.

The present invention provides a unique configuration for enclosing a gear drive used in a hygienic and sanitary environment thus inhibiting the entrapment therein of any deleterious materials that would support the growth of bacteria, fungi, mold and other microorganisms.

What is claimed is:

1. A gear drive casing apparatus for enclosing a gear drive used in a hygienic and sanitary environment, said gear drive casing apparatus comprising:
   a member having an external contoured surface, said member enclosing the gear drive;
   a further member having a further external contoured surface, said surface and said further surface cooperating with each other to define therebetween a smooth uninterrupted intersection such that such contoured surfaces and said intersection therebetween are easily cleaned, said surfaces and intersection presenting a self-draining configuration which inhibits the entrapment therein of any unhygienic and unsanitary materials that would support the growth of bacteria, fungi, mold and other microorganisms;
   said gear drive including:
   an input shaft having a first and a second end, said input shaft defining a worm disposed between said first and second ends of said input shaft;
   a bearing for bearingly supporting said second end of said input shaft;
   an output shaft disposed angularly relative to said input shaft, said output shaft having a first and a second extremity, said output shaft defining a worm gear disposed between said first and second extremity of said output shaft;
   a second bearing for bearingly supporting said first extremity of said output shaft;
   a third bearing for bearingly supporting said second extremity of said output shaft;
   said worm gear cooperating with said worm such that said worm gear is driven by said worm;
   a closure defined by said further member;
   said closure being recessed into said further external contoured surface;
   said closure being sealed such that escape of lubricant from within said members is prevented and so that ingress of washdown liquids into said members is inhibited;
   an interference fit flush plug disposed within said closure;
   a breather secured to said further member such that a build up of pressure within said members due to generation of heat during operation of the gear drive is prevented;
   said breather including:
   a housing secured to said further member, said housing defining an enclosure, said enclosure being in fluid communication with a further enclosure defined by said members, said further enclosure being occupied by said input and output shafts; and
   a diaphragm disposed within said enclosure such that said enclosure is divided by said diaphragm into an internal and an external chamber, said diaphragm moving within said enclosure so that said internal chamber expands commensurate with an increased temperature within said further enclosure due to operation of said gear drive and a resultant increased pressure within said further enclosure so that a pressure within said further enclosure remains substantially constant.

2. A gear drive casing apparatus as set forth in claim 1 wherein
   said gear drive casing is fabricated from a metallic material.

3. A gear drive casing apparatus as set forth in claim 2 wherein
   said metallic material is stainless steel.

4. A gear drive casing apparatus as set forth in claim 1 wherein
   said gear drive casing is coated with a non-corrosive coating material.

5. A gear drive casing apparatus as set forth in claim 3 wherein
   said non-corrosive coating material is a plastics material.

6. A gear drive casing apparatus as set forth in claim 5 wherein
   said plastics material is a polymeric material.

7. A gear drive casing apparatus as set forth in claim 5 wherein
   said plastics material is an elastomeric material.

8. A gear drive casing apparatus as set forth in claim 3 wherein
   said non-corrosive coating material is a painted carbon steel.

9. A gear drive casing apparatus as set forth in claim 3 wherein
   said non-corrosive coating material is a painted cast iron.

10. A gear drive casing apparatus as set forth in claim 3 wherein
said non-corrosive coating material is an epoxy.

11. A gear drive casing apparatus as set forth in claim 1 wherein
said gear drive casing is manufactured from a non-metallic material.

12. A gear drive casing apparatus as set forth in claim 1 wherein
said gear drive casing is manufactured from aluminum.

13. A gear drive casing apparatus as set forth in claim 1 wherein
said member encloses said first end of said input shaft;
said further member encloses said second end of said input shaft and said bearing.

14. A gear drive casing apparatus as set forth in claim 13 wherein
said member includes:
a flange which extends radially away from said first end of said input shaft such that said contoured surface defines a first area disposed in a vicinity of said first end of said input shaft and a second area disposed in a vicinity of said flange so that a transition from said first area to said second area is gradually curved thereby inhibiting a buildup of said unhygienic and unsanitary materials between said areas.

15. A gear drive casing apparatus as set forth in claim 1 further including:
an oil seal cooperating with said input shaft for sealing said input shaft relative to said member, said oil seal defining a sealing lip which seals said input shaft;
a further oil seal cooperating with said output shaft for sealing said output shaft relative to said further member, said further oil seal defining a further sealing lip which seals said output shaft.

16. A gear drive casing apparatus as set forth in claim 1 further including:
an oil seal cooperating with said input shaft for sealing said input shaft relative to said member, said oil seal defining a plurality of sealing lips which seal said input shaft;
a further oil seal cooperating with said output shaft for sealing said output shaft relative to said further member, said further oil seal defining a further plurality of sealing lips which seal said output shaft.

17. A gear drive casing apparatus for enclosing a gear drive used in a hygienic and sanitary environment, said gear drive casing apparatus comprising:
a member having an external contoured surface, said member enclosing the gear drive;
a further member having a further external contoured surface, said surface and said further surface cooperating with each other to define therebetween a smooth uninterrupted intersection such that such contoured surfaces and said intersection therebetween are easily cleaned, said surfaces and intersection presenting a self-draining configuration which inhibits the entrapment therein of any unhygienic and unsanitary that would support the growth of bacteria, fungi, mold and other microorganisms;
said gear drive including:
an input shaft having a first and a second end, said input shaft defining a worm disposed between said first and second ends of said input shaft;
a bearing for bearingly supporting said second end of said input shaft;
an output shaft disposed radially relative to said input shaft, said output shaft having a first and a second extremity, said output shaft defining a worm gear disposed between said first and second extremity of said output shaft;
a second bearing for bearingly supporting said first extremity of said output shaft;
a third bearing for bearingly supporting said second extremity of said output shaft;
said worm gear cooperating with said worm such that said worm gear is driven by said worm;
said gear drive casing being fabricated from a metallic material;
said gear drive casing being coated with a non-corrosive coating material;
said member enclosing said first end of said input shaft;
said further member enclosing said second end of said input shaft and said bearing;
said member including:
a flange which extends radially away from said first end of said input shaft such that said contoured surface defines a first area disposed in a vicinity of said first end of said input shaft and a second area disposed in a vicinity of said flange so that a transition from said first area to said second area is gradually curved thereby inhibiting a buildup of said unhygienic and unsanitary materials between said areas;
a closure defined by said further member;
said closure being recessed into said further external contoured surface;
said closure being sealed such that escape of lubricant from within said members is prevented and so that ingress of washdown liquids into said members is inhibited;
an interference fit flush plug being disposed within said closure;
an oil seal cooperating with said input shaft for sealing said input shaft relative to said member, said oil seal defining a sealing lip which seals said input shaft;
a further oil seal cooperating with said output shaft for sealing said output shaft relative to said further member, said further oil seal defining a further sealing lip which seals said output shaft;
a breather secured to said further member such that a build up of pressure within said members due to generation of heat during operation of the gear drive is prevented;
said breather including:
a housing secured to said further member, said housing defining an enclosure, said enclosure being in fluid communication with a further enclosure defined by said members, said further enclosure being occupied by said input and output shafts; and
a diaphragm disposed within said enclosure such that said enclosure is divided by said diaphragm into an internal and an external chamber, said diaphragm moving within said enclosure so that said internal chamber expands commensurate with an increased temperature within said further enclosure due to operation of said gear drive and a resultant increased pressure within said further enclosure so that a pressure within said further enclosure remains substantially constant.

* * * * *